United States Patent [19]

Blakeney, II et al.

[11] Patent Number: 5,638,412
[45] Date of Patent: Jun. 10, 1997

[54] METHOD FOR PROVIDING SERVICE AND RATE NEGOTIATION IN A MOBILE COMMUNICATION SYSTEM

[75] Inventors: Robert D. Blakeney, II, Steamboat Springs, Colo.; Edward G. Tiedemann, Jr., San Diego, Calif.

[73] Assignee: Qualcomm Incorporated, San Diego, Calif.

[21] Appl. No.: 260,192

[22] Filed: Jun. 15, 1994

[51] Int. Cl.$^6$ .................................................. H04L 23/00
[52] U.S. Cl. .............................. 375/377; 375/358; 455/69; 370/341
[58] Field of Search ........................ 375/222, 377, 375/358; 371/32; 370/84, 95.1, 95.3, 110.1; 379/59, 60; 455/33.1, 33.2, 69

[56] References Cited

U.S. PATENT DOCUMENTS

| | | | |
|---|---|---|---|
| 4,756,009 | 7/1988 | Qureshi et al. | 375/222 |
| 4,763,322 | 8/1988 | Eizenhofer | 370/95 |
| 4,953,210 | 8/1990 | McGlynn et al. | 375/222 |
| 5,267,244 | 11/1993 | Messerschmitt et al. | 375/363 |

FOREIGN PATENT DOCUMENTS 0210698  2/1987  European Pat. Off. ......... H04Q 7/04

*Primary Examiner*—Tesfaldet Bocure
*Assistant Examiner*—Kevin Kim
*Attorney, Agent, or Firm*—Russell B. Miller; Roger W. Martin; Sean English

[57] ABSTRACT

A method and apparatus for negotiating service configuration in a digital communication system is disclosed. In an exemplary embodiment the service negotiation system is implemented in a wireless spread spectrum communication system. The service configuration comprises data rates, frame formats and types of services. Types of service may include speech encoding, facsimile or digital data services. Further described herein is a digital transmitter and receiver using the service negotiation system to provide service configuration mutually acceptable at both ends of a communication link.

29 Claims, 5 Drawing Sheets

FIG. 3a
GENERAL FRAME STRUCTURE

| FRAME FORMAT | TRAFFIC | OVERHEAD |

FIG. 3b
PRIMARY TRAFFIC ONLY

| FRAME FORMAT | PRIMARY TRAFFIC | OVERHEAD |

FIG. 3c
PRIMARY & SIGNALLING TRAFFIC

| FRAME FORMAT | PRIMARY TRAFFIC | SIGNALLING TRAFFIC | OVERHEAD |

FIG. 3d
PRIMARY & SECONDARY

| FRAME FORMAT | PRIMARY TRAFFIC | SECONDARY TRAFFIC | OVERHEAD |

FIG. 3e
SIGNALLING ONLY

| FRAME FORMAT | SIGNALLING TRAFFIC | OVERHEAD |

FIG. 3f
SECONDARY ONLY

| FRAME FORMAT | SECONDARY TRAFFIC | OVERHEAD |

FIG. 3g
PRIMARY SIGNALLING & SECONDARY

| FRAME FORMAT | PRIMARY | SIGNALLING | SECONDARY | OVERHEAD |

METHOD FOR PROVIDING SERVICE AND RATE NEGOTIATION IN A MOBILE COMMUNICATION SYSTEM

BACKGROUND OF THE INVENTION

1. Field of the Invention

The present invention relates to communication systems. More particularly, the present invention relates to a novel and improved method for providing rate and service negotiation in a wireless communication system.

2. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. However the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

A method for transmission of speech in digital communication systems that offers particular advantages in increasing capacity while maintaining high quality of perceived speech is by the use of variable rate speech encoding. The method and apparatus of a particularly useful variable rate speech encoder is described in detail in U.S. Pat. No. 5,414,796, assigned to the assignee of the present invention, of which the disclosure thereof is incorporated by reference herein.

A variable rate speech encoder provides speech data at full rate when the talker is actively speaking, thus using the full capacity of the transmission frames. When a variable rate speech coder is providing speech data at a less that maximum rate, there is excess capacity in the transmission frames. A method for transmitting additional data in transmission frames of a fixed predetermined size, wherein the source of the data for the data frames is providing the data at a variable rate is described in detail in U.S. Pat. No. 5,504,773, assigned to the assignee of the present invention, of which the disclosure thereof is incorporated by reference herein. In the above mentioned patent a method and apparatus is disclosed for combining data of differing types from different sources in a data frame for transmission.

As digital communication systems become more prevalent, applications of the systems are growing. As the applications available grow, there is an increasing probability of differing capabilities between devices on each end of a communication link. Such differing capabilities can be in the form of encoding or decoding frame structure formats, or in service types provided or in data rates supported. As the probability of differing capabilities grows there is an increasing need for service negotiation between devices attempting to communicate in a wireless communication system.

SUMMARY OF THE INVENTION

The present invention is a novel and improved method for performing rate and service negotiation in a digital communication system. In the exemplary environment of a wireless communication system, service negotiation is described between a mobile station and a base station. In the exemplary embodiment, the mobile station and base station communicate data in frames. The data communicated may be primary or speech data, secondary or digital data, or signaling data.

It is an object of the present invention to provide a method and apparatus for service negotiation in a wireless communication system. One possible case when service negotiation might be used includes determining initial type of service when a traffic channel connection is first originated. Another case when service negotiation might be used is in modifying the existing service type while maintaining the traffic channel connection. A third case when service negotiation may be used is dropping the existing service and adding a new service while maintaining the traffic channel connection (e.g., changing from transmitting speech to transmitting modem or facsimile data). A fourth case when service negotiation might be used is in adding a new service while maintaining the traffic channel connection. An example of this is if one is transmitting speech data and then wishes to transmit modem data in parallel. A fifth case where service negotiation may be used is in modifying existing service due to changes in the link such as range between the mobile station and base station (e.g. decreasing transmission rates as range increases and increasing transmission rates as range decreases) or during handoff between base stations where different speech coders or different rate sets may be used.

It is an advantage of the present invention to provide a method and apparatus for performing the service negotiation process with minimum data transfer over common channels, i.e. paging channels or access channels, and if the service configuration is not accomplished over the common channels to continue service negotiation over traffic channels of additional capacity.

In an alternative embodiment, no information about the traffic channel connection would be specified in the origination message with all negotiation taking place over the traffic channel. All that is specified on the access channel is the desire to make the traffic channel connection and service negotiation would be deferred to the traffic channel communications. This type of service negotiation is particularly useful in mobile to satellite communications, but is applicable to all communication systems.

It is further an advantage of the present invention to provide a method and apparatus for changing the service configuration between communicating devices without dropping the traffic channel connection currently in place. Such cases where changing the service configuration without dropping the traffic channel connection is desirable include providing an additional service or completion of a service in a multiple service traffic channel connection and a change in rate compatibility or desirability due to a change in communication environment or logistics. In the present invention, in a wireless communication system in which a first communication device originates a communication service with a second communication device, a method for negotiating service configuration is disclosed, comprising the steps of generating a request message indicative of a service configuration at the first communication device, transmitting the request message, receiving the transmitted message at the second communication device, determining if the service configuration request is acceptable to the second communication device in accordance with the current capabilities of the second communication device, generating a response message in accordance with the determination, and transmitting the response message.

Also, in the present invention an apparatus for transmitting information is disclosed comprising a service negotiator for providing a message indicative of a requested service configuration, and a transmitter for transmitting the service request message. Further disclosed in the present invention is a system for receiving information comprising a receiver for receiving a transmitted message indicative of a requested service configuration, and a service negotiator for determining in accordance with a predetermined set of parameters a response message to the request message.

In addition is disclosed a method is disclosed for changing service configuration of a traffic channel connection without terminating the traffic channel connection. In an exemplary embodiment of a wireless communication system in which a first communication device is communicating with a second communication device and wherein the first communication device requests a change of service configuration without terminating the current traffic channel connection, a method for negotiating a change in service configuration, comprises the steps of generating a request message indicative of a request to change service configuration at the first communication device, transmitting the request message concurrently with transmitting data in the current service configuration, receiving the transmitted message at the second communication message at the second communication device, determining if the service configuration request is acceptable to the second communication device in accordance with the current capabilities of the second communication device, generating a response message in accordance with the determination, and transmitting the response message.

Though the present invention is illustrated in the exemplary embodiment in a wireless communication system, it is equally applicable to any communication system where communication resources may be negotiated. It is envisioned that present invention is equally applicable to wireline communication systems where physical layer capabilities may be negotiated, and in fixed satellite communication systems. In addition the present invention applies equally to cases of one way communication from the base station to the mobile station only or from the mobile station to the base station only.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 3a–3g is an illustration of an exemplary set mixed data frames; and

DETAILED DESCRIPTION OF THE PREFERRED EMBODIMENTS

Figure 1:
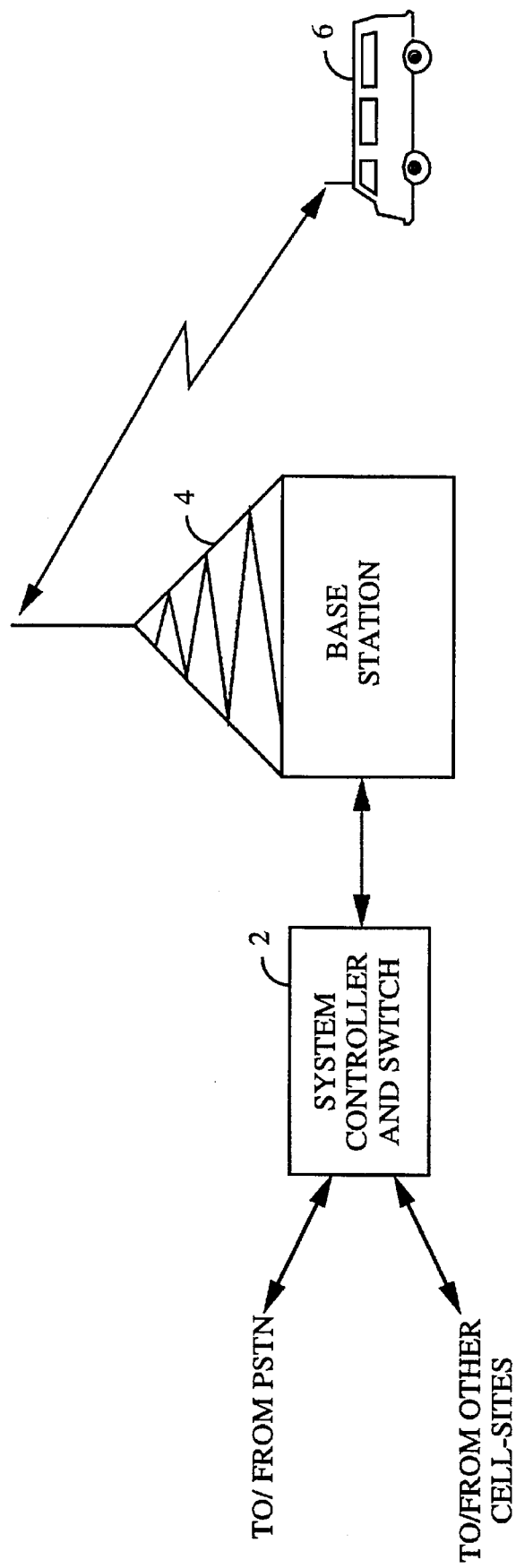
FIG. 1 is an illustration of a wireless communication system.

In the exemplary embodiment, the present invention is presented in a mobile wireless environment. It is envisioned that the present invention is equally applicable to wireless stationary environments such as wireless local loop applications. Referring to FIG. 1, information may be provided to and from a public switching telephone network (PSTN) to system controller and switch 2, or may be provided to and from controller and switch 2 by another base station if the traffic channel connection is a mobile station to mobile station communication. System controller and switch 2, in turn, provides data to and receives data from base station 4. Base station 4 transmits data to and receives data from mobile station 6. In the exemplary embodiment the signals transmitted between base station 4 and mobile station 6 are spread spectrum communication signals, the generation of the waveforms of which are described in detail in the abovementioned U.S. Pat. No. 4,901,307.

In the exemplary embodiment, there are three separate channels over which information is communicated between base station 4 and mobile station 6. The traffic channel is for one or two way communication of information between mobile station 4 and base station 6 and is uniquely allocated for communications to and from mobile station 6. Information traffic, in the exemplary embodiment, includes primary traffic, secondary traffic and signaling traffic. Primary and secondary traffic communicate digital information data such as speech, modem or facsimile data, and signaling data communicates information to initiate and maintain a link in the communication system such as power control or service negotiation information.

The remaining channels are the paging channel and the access channel. These channels are common to all mobile stations communicating with a base station or set of base stations. Because of the commonality of the these channels, capacity is a significant issue and messages transmitted over them must be restricted to a minimum. The paging channel is for one way communication of messages between base station 4 and the mobile station 6. The access channel is for one way communication of messages between mobile station 6 and the base station 4.

When using the traffic channel, mobile station 4 and base station 6 communicate through the exchange of forward and reverse traffic channel frames. Forward traffic channel frames refer to those frames of information transmitted from base station 4 to mobile station 6. Conversely, reverse traffic channel frames refer to those frames of information transmitted from mobile station 6 to base station 4. Mobile station 6 and base station 4 use a common set of attributes for building and interpreting traffic channel frames. This set of attributes, referred to as a service configuration, consists of the following:

1. Forward and Reverse Multiplex Options: These control the way in which the information bits of the Forward and Reverse Traffic Channel frames, respectively, are divided into various types of traffic, such as signaling traffic, primary traffic and secondary traffic. Associated with each multiplex option is a rate set which specifies the frame structures and transmission rates supported by the multiplex option. The multiplex option used for the Forward Traffic Channel can be the same as that used for the Reverse Traffic Channel, or it can be different.

2. Forward and Reverse Traffic Channel Transmission Rates: These are the transmission rates actually used for the Forward and Reverse Traffic Channels respectively. The transmission rates for the Forward Traffic Channel can include all of the transmission rates supported by the rate set associated with the Forward Traffic Channel multiplex option, or a subset of the supported rates. Similarly, the transmission rates used for the Reverse Traffic Channel can include all rates supported by the rate set associated with the Reverse Traffic Channel multiplex option, or a subset of the supported rates. The transmission rates used for the Forward Traffic Channel can be the same as those used for the Reverse Traffic Channel, or they can be different.

3. Service Option Connections: These are the services in use on the Traffic Channel. It is possible that there is no service option connection, in which case the mobile station and base station use the Forward and Reverse Traffic Channels to send only signaling traffic; or there can be one or multiple service option connections.

Associated with each service option connection are a service option, a Forward Traffic Channel traffic type, a Reverse Traffic Channel traffic type and a service option connection reference. The associated service option formally defines the way in which traffic bits are processed by the mobile station and base station. For example a service option may specify the speech encoding or decoding format to be used or the data service protocol to be employed. The associated Forward and Reverse Traffic Channel traffic types specify the types of traffic used to support the service option. A service option can require the use of a particular type of traffic, such as primary or secondary, or it can accept more than one traffic type. Likewise, a service option can be one-way, in which case it can be supported on the Forward Traffic Channel only, the Reverse Traffic Channel only, or on either the Forward or Reverse Traffic Channel; or the service option can be two-way, in which case it can be supported on the Forward and Reverse Traffic Channels simultaneously. The associated service option connection reference provides a means for uniquely identifying the service option connection. The reference serves to resolve ambiguity when there are multiple service option connections in use.

Mobile station 6 can propose an initial service configuration at traffic channel connection origination, and can propose new service configurations during Traffic Channel operation. A proposed service configuration can differ greatly from its predecessor or can be very similar. For example, mobile station 6 can propose a service configuration in which all of the service option connections are different from those of the existing configuration; or mobile station 6 can propose a service configuration in which the existing service option connections are maintained with only minor changes, such as a different set of transmission rates or a different mapping of service option connections to Forward and Reverse Traffic Channel traffic types.

If mobile station 6 proposes a service configuration that is acceptable to base station 4, they both begin using the new service configuration. If mobile station 6 proposes a service configuration that is not acceptable to base station 4, base station 4 can reject the proposed service configuration or propose an alternative service configuration. If base station 4 proposes an alternative service configuration, mobile station 6 can accept or reject the service configuration proposed by base station 4, or propose yet another service configuration. This process, called service negotiation, ends when mobile station 6 and base station 4 find a mutually acceptable service configuration, or when either mobile station 6 or base station 4 rejects a service configuration proposed by the other.

It is also possible for base station 4 to propose an initial service configuration when paging mobile station 6 or propose new service configurations during Traffic Channel operation. The service negotiation proceeds as described above, but with the roles reversed.

The following messages are used to support service configuration and negotiation:

1. Service Request Message: Mobile station 6 can use this message to propose a service configuration, or to accept or reject a service configuration proposed in a Service Response Message. Base station 4 can use this message to propose a service configuration, or to reject a service configuration proposed in a Service Response Message.

2. Service Response Message: Mobile station 6 can use this message to accept or reject a service configuration proposed in a Service Request Message, or to propose an alternative service configuration. Base station 4 can use this message to reject a service configuration proposed in a Service Request Message, or to propose an alternative service configuration.

3. Service Connect Message: Base station 4 can use this message to accept a service configuration proposed in a Service Request Message or Service Response Message, and instruct mobile station 6 to begin using the service configuration.

4. Service Connect Completion Message: Mobile station 6 can use this message to acknowledge the transition to a new service configuration.

5. Service Option Control Message: Mobile station 6 and base station 4 can use this message to invoke service option specific functions.

6. Origination Message: Mobile station 6 can use this message to propose an initial service configuration.

7. Channel Assignment Message: Base station 4 can use this message to accept or reject the initial service configuration proposed by mobile station 6 in an Origination Message or a Page Response Message.

8. Page Message: Base station 4 can use this message to propose an initial service configuration.

9. Page Response Message: Mobile station 6 can use this message to accept or reject the initial service configuration proposed by base station 4 in a Page Message, or to propose an alternative initial service configuration.

10. Status Request Message Base station 4 and mobile station 6 can use this message to request service capability information from the mobile station.

11. Status Response Message: Mobile station 6 and base station 4 can use this message to return the service capability information requested by base station 4 in a Status Request Message.

During origination of a mobile station terminated traffic channel connection, base station 4 sends out a page message over the paging channel, which identifies mobile station 6 and requests a service configuration. Mobile station 6 then provides a page response message over the access channel which acknowledges the page, and either accepts the requested service configuration or suggests another service configuration. Base station 4 receives the page response message and then responds with a channel assignment message.

If mobile station 6 has accepted the service configuration requested in the page message or if the alternative service configuration requested by mobile station 6 in the page response message is acceptable to base station 4, base station 4 transmits a channel assignment message accepting or acknowledging the agreed upon service configuration and providing traffic channel information directing mobile station 6 to a traffic channel over which communications may be conducted using the accepted service configuration. If the alternative service configuration requested by mobile station 6 in the page response message is not acceptable to base station 4, then base station 4 transmits a signal containing a channel assignment message rejecting the requested alternative service configuration and providing traffic channel information directing mobile station 6 to a traffic channel over which communications may be conducted using a default service configuration which is a universal default service configuration acceptable to all mobile stations and base stations for communicating signaling data. The service negotiation proceeds over the traffic channel using the universal default service configuration. There also may exist more than one universal default service configuration in which case the base station selects one from a set of universal default service configurations appropriate to the conditions and specifies the selection in the channel assignment message. The service negotiation proceeds over the traffic channel using the universal default service configuration.

In the exemplary embodiment, during service negotiation over the traffic channel messages are transmitted containing four fields of service negotiation information. The first field specifies the service option, and in the exemplary embodiment is sixteen bits long. The second and third specify the forward and reverse multiplex options respectively and each are sixteen bits long. The fourth field specifies the rates. As stated earlier, each multiplex option has an associated rate set. The rate field of the exemplary embodiment has a single bit for each associated rate of the reverse multiplex option and a single bit for each associated rate of the forward multiplex option. These bits are indicative of a whether or not to accommodate each of the rates within the associated set of rates. For example, say that associated with a multiplex option are four rates, a highest and three lesser rates. If the device is not able to accommodate the highest rate but is able to accommodate the lesser rates, then it would set the bit associated with the highest rate to indicate that the highest rate is not acceptable and set three other bits to indicate that they are acceptable. It should be noted that the selection of a rate subset within the set of associated rates is not limited to precluding the highest rates but that any rate subset may be selected during rate negotiation. For example the device may specify that the highest rate is acceptable, but that one of the lesser rates is not acceptable.

In a preferred embodiment each request message specifies a sequence number to be included in the corresponding response message. This sequence number serves to associate a response message with the correct request message. One example in which this is useful is in the case where the mobile station transmits a request message, but the base station is occupied and cannot immediately respond. If the mobile station transmits a second request before it receives a response from the base station to the first request, it is important upon receiving a response message to know to which request the response message is responsive.

At the initiation of a mobile station originated traffic channel connection, mobile station 6 sends out a signal consisting of an origination message specifying a service configuration request and registration information over the access channel to base station 4. Base station 4 responds by transmitting a signal consisting of a channel assignment message and traffic channel information. The channel assignment message contains a response accepting or rejecting the service requested in the origination message.

If base station 4 accepts the service configuration requested in the origination message, then base station 4 provides a message accepting the requested service configuration. If the service configuration requested by the mobile station 6 in the origination response message is not acceptable to base station 4, then base station 4 transmits a channel assignment message providing traffic channel information directing mobile station 6 to a traffic channel over which communications are conducted using the universal default service configuration. Service negotiation continues over the traffic channel using the universal default service configuration until a service configuration is agreed upon or until either base station 4 or mobile station 6 terminates the process by rejecting a service configuration proposed by the other.

In a preferred embodiment, at any point prior to or during service negotiation base station 4 or mobile station 6 may transmit a status request message, requesting information about the capabilities of mobile station 6 or base station 4 respectively. In response to the transmitted status request message the receiving device, either base station 4 or mobile station 6, would transmit a status response message indicating its capabilities. The service negotiator of the requesting device would then in accordance with the received status response message determine a service configuration which would be best for the application. Also, the base station may transmit its capabilities on the paging channel so that the mobile station does not need to request information regarding the capabilities of the base station. In addition, the base station may store the capabilities of the mobile station in a database, thus avoiding the need to request capability information from the mobile station. The mobile station may inform the base station when changes in its capabilities occurs so that the base station can update its database.

Figure 2:
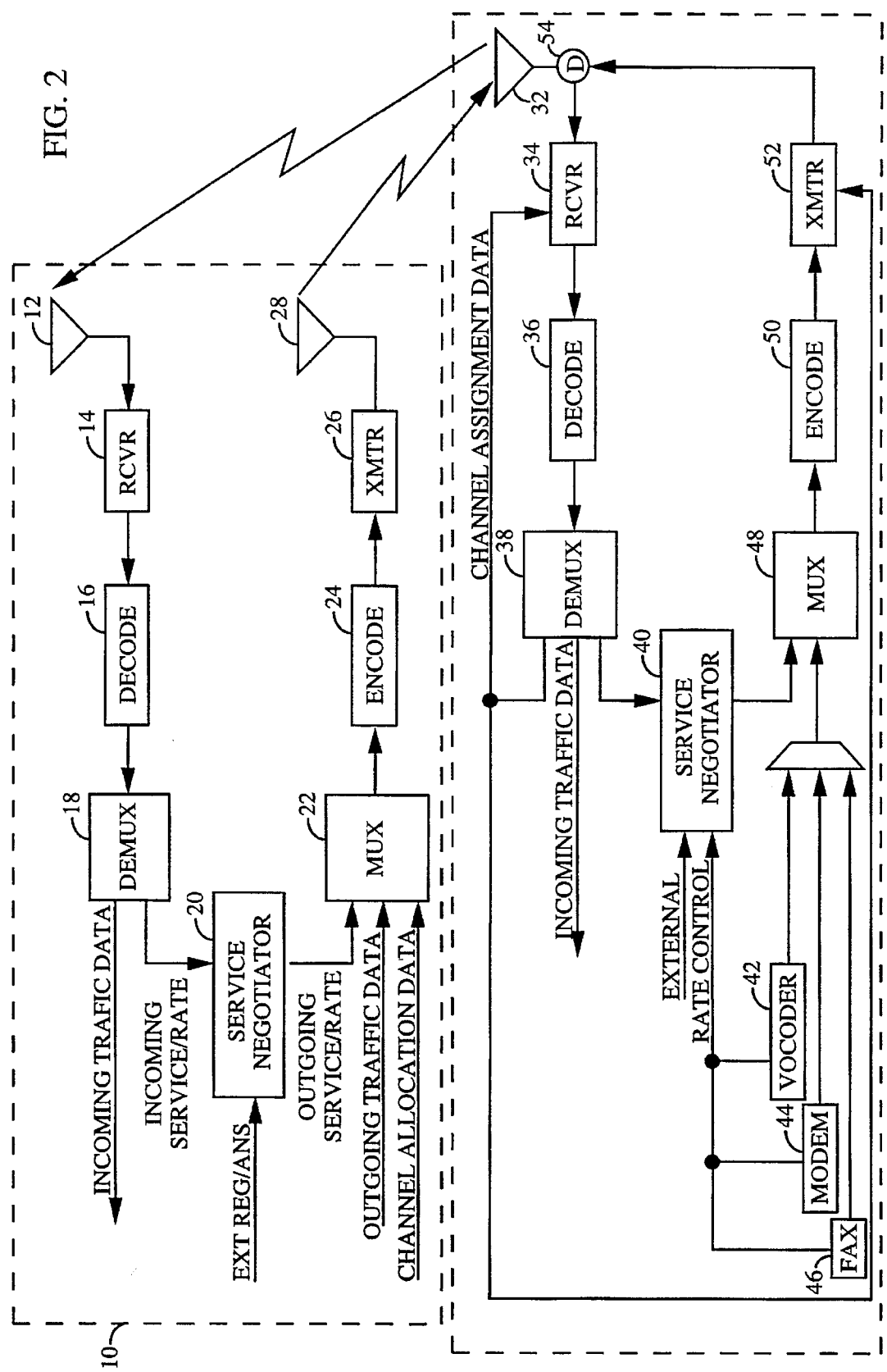
FIG. 2 is a block diagram of the wireless communication system of the present invention.

FIG. 2 illustrates the base station and mobile station apparatus of the present invention. At the initiation of a mobile station terminated traffic channel connection, service negotiator 20 provides a service configuration request or may request to defer service negotiation to be conducted over the traffic channel. In the exemplary embodiment, service negotiator 20 provides a sixteen bit message specifying the service configuration request. This allows the service negotiator to specify $2^{16}-1$ different possible configurations reserving one configuration message to defer service negotiations to be conducted over the traffic channel.

Multiplexer 22 combines the page message with mobile station address information and provides the combined signal to encoder 24. Encoder 24 encodes the combined signal and provides the encoded signal to transmitter 26. Transmitter 26 upconverts, modulates and amplifies the encoded signal and provides the signal to antenna 28 for transmission over the paging channel. In the exemplary embodiment the modulation format is a spread spectrum modulation format, which is described in detail in U.S. Pat. No. 4,901,307. Although spread spectrum modulation is described in the aforementioned patent at a spreading rate of 1.25 MHz, the present invention is equally applicable to spreading rates of 2.5 MHz, 5.0 MHz and any other spreading rates. The present invention is equally applicable to any known modulation format.

The transmitted signal is received at mobile station 30 by antenna 32. The received signal is provided by antenna 32 through duplexer 48 to receiver 34. Receiver 34 downconverts and demodulates the received signal and provides the signal to decoder 36. Decoder 36 decodes the received signal and provides the decoded signal to demultiplexer 38. Demultiplexer 38 separates the page message from the mobile station address data and provides the page request message to service negotiator 40.

Service negotiator 40 determines in accordance with the current mobile station capabilities a page response message which indicates whether to accept or reject the requested service configuration of the page message or whether to suggest an alternative service configuration and if so which alternative service configuration to suggest. Service negotiator 40 provides the page response message to multiplexer 48. Multiplexer 48 combines the page response message with additional information which may include registration parameters and other mobile station parameters from, e.g., a vocoder 42, modem 44, and facsimile apparatus 46. The combined signal is provided to encoder 50. Encoder 50 encodes the combined data and provides the encoded signal to transmitter 52. Transmitter 52 upconverts, modulates and amplifies the encoded signal and provides it through duplexer 54 to antenna 32 for transmission over the access channel.

The signal transmitted from mobile station 30 is received at base station 10 by antenna 12. The received signal is provided by antenna 12 to receiver 14 where the signal is downconverted, demodulated and provided to decoder 16. Decoder 16 decodes the signal and provides the decoded signal to demultiplexer 18. Demultiplexer 18 separates the decoded signal into the page response message and other data transmitted by mobile station 30.

The page response message is provided to service negotiator 40. If the page response message indicates acceptance of the service configuration requested by the page message or if the alternative service configuration of the page response message is acceptable to base station 10, then service negotiator 20 provides a channel assignment message accepting or acknowledging the agreed upon service configuration to multiplexer 48. Furthermore service negotiator 22 provides a signal indicative of the agreed upon service configuration to encoder 24 and decoder 20 which encode and decode future data including future messages on the traffic channel in accordance with the agreed upon service configuration. If the requested alternative service configuration of the page response message is not acceptable then service negotiator 20 provides a channel assignment message specifying the universal default service configuration to multiplexer 22.

Multiplexer 22 combines the channel assignment message with traffic channel information and provides the combined signal to encoder 24. Encoder 24 encodes the combined message and provides the encoded message to transmitter 26, which in turn upconverts, modulates and amplifies the signal, then provides it to antenna 28 for transmission over the paging channel.

The transmitted signal received at antenna 32 is provided through duplexer 54 to receiver 34 where it is downconverted, demodulated and provided to decoder 36. Decoder 36 decodes the signal and provides it to demultiplexer 38. Demultiplexer 38 separates the traffic channel information from the channel assignment message. Demultiplexer 38 provides the traffic channel information to receiver 34 and transmitter 52 and provides the service negotiation information to service negotiator 40. If a service configuration is not agreed upon then service negotiator 40 provides a signal indicative of the universal default service configuration to encoder 50 and decoder 36, and service negotiation continues over the traffic channel until a service configuration is agreed upon or the traffic channel connection is dropped.

In the case of traffic channel connection initiation in a mobile station originated traffic channel connection, service negotiator 40 in mobile station 30 provides an origination message indicative of a service configuration requested by mobile station 30 to multiplexer 48. Multiplexer 48 may combine the origination message with other information, such as registration information, numbering plan information and dialed digit information and provides the combined signal to encoder 50. Encoder 50 encodes the combined signal and provides the encoded signal to transmitter 52. Transmitter 52 upconverts, modulates and amplifies the encoded signal, and provides it through duplexer 54 to antenna 32 for transmission over the access channel.

Base station 10 receives the transmitted signal at antenna 12. The received signal is provided by antenna 12 to receiver 14 where the signal is downconverted, demodulated and provided to decoder 16. Decoder 16 decodes the signal and provides the decoded signal to demultiplexer 18. Demultiplexer 18 separates the origination information from registration information and numbering plan information and provides the origination message to service negotiator 20. Service negotiator 20 determines whether the service configuration requested in the origination message is acceptable.

Service negotiator 20 provides a channel assignment message accepting the requested service configuration or specifying that the universal default service configuration is to be used. The service configuration channel assignment message is combined in multiplexer 22 with traffic channel information and the combined signal is provided to encoder 24. Encoder 24 encodes the combined signal and provides the encoded signal to transmitter 26. Transmitter 26 upconverts, modulates and amplifies the encoded signal and provides it to antenna 28 for transmission over the paging channel.

Mobile station 30 receives the transmitted signal at antenna 32. The received signal is provided through duplexer 54 to receiver 34 which downconverts and demodulates the signal and provides the signal to decoder 36. Decoder 36 decodes the signal and provides the decoded signal to demultiplexer 38. Demultiplexer 38 separates the channel assignment message from the traffic channel information. Demultiplexer 38 provides the traffic channel information to receiver 34 and transmitter 52 with which the transmitter and receiver set up for transmission and reception of information over the traffic channel. Demultiplexer 38 provides the channel assignment message to service negotiator 40. If the channel assignment message indicates base station 10 has accepted the requested service configuration, then service negotiator 40 provides the information regarding the accepted service configuration to decoder 36 and encoder 38. If the service configuration channel assignment message indicates base station 10 has rejected the requested service configuration, then service negotiator 40 provides the information regarding the universal default service configuration to decoder 36 and encoder 38 and service configuration negotiation continues over the traffic channel. Negotiation continues until a mutually acceptable service configuration is found or the traffic channel connection is dropped.

An exemplary set of frame formats as specified in the forward and reverse multiplex options of the service configuration is illustrated in FIGS. 3a–g. The method and apparatus for providing multiplexed frames of data is described in detail in copending U.S. patent application Ser. No. 08/171,146. FIG. 3a illustrates an exemplary generic frame format. The frame of FIG. 3a consists of three fields: a frame format field, a traffic field and an overhead field. The frame format field tells the receiving device which frame format of the set of frame formats allowed by the current multiplex option is applicable to decoding the current frame of information. The traffic field contains the data that is being transmitted. In the exemplary embodiment, there are three types of traffic. Traffic, in the exemplary embodiment, includes primary traffic, secondary traffic and signaling traffic. Primary and secondary traffic communicate digital information data such as speech, modem or facsimile data, and signaling data communicates information to initiate and maintain a link in the communication system such power control information or service negotiation information. Overhead data is data transmitted to increase the quality of the frames being transmitted such as error correction bits or decoder tail bits.

FIG. 3b illustrates a frame with only primary or speech traffic being transmitted. FIG. 3c illustrates a frame in which both speech and signaling traffic are being transmitted simultaneously, and FIG. 3d illustrates a frame in which primary traffic and secondary traffic are being transmitted simultaneously. FIGS. 3e and 3f illustrate frames in which only signaling traffic or secondary are being transmitted. In FIG. 3g, primary secondary and signaling traffic are all being transmitted simultaneously.

In an exemplary service configuration, a variable rate vocoder, such as that describe in copending U.S. patent application Ser. No. 08/004,484, is used to provide the primary traffic. When the primary traffic is provided at less than a predetermined maximum data rate, then there exists excess capacity in the transmitted frames. This excess capacity can be used to accommodate the simultaneous transmission of secondary or signaling traffic. In the exemplary embodiment, secondary or signaling traffic is buffered until a frame of less than the predetermined maximum rate for primary traffic is provided by the variable rate vocoder, at which time a portion of the buffered secondary or signaling traffic is provided in the excess capacity of the frame. In a preferred, yet exemplary embodiment, when the transmitting device is aware of secondary or signaling traffic for transmission it signals the vocoder and the vocoder forces a set of frames to a lower than maximum rate in which the secondary or signaling traffic can be provided.

Referring again to FIG. 2, primary traffic is provided by vocoder 42, while secondary traffic is provided by modem 44 or facsimile 46. Signaling traffic is provided by a microprocessor (not shown) via the external signaling line to multiplexer 48 and also by service negotiator 40. Multiplexer 48 combines the various data forms into the frame formats in accordance with the selected multiplex option.

One important feature of the present invention is the capability of performing the service negotiation without interrupting the currently selected service in progress. An example of a case when this may be desirable occurs when a user is communicating by means of a selected service configuration, and decides that it is necessary or desirable to perform an additional operation in parallel or in place of the previously selected service configuration. A specific example is if a user is transmitting speech data only, but during the course of the conversation wishes to transmit facsimile or modem data in parallel. The user informs the service negotiator of the desire to transmit secondary data and the service negotiator then prepares the configuration to accommodate the additional function.

Another example may occur when a user is transmitting at a data rate or set of data rates, but because of logistics or other factors the energy required of the mobile station to support the data rate becomes unacceptably high. In an exemplary embodiment, the mobile station may receive information frown the base station indicative of the quality of received traffic frames. If the quality level becomes too low then it may be necessary for the mobile station to transmit at lower rate or set of rates. By reducing the data rate the mobile station could if desired keep its transmission power the same while increasing its energy per bit. Any method of detecting a need to modify the data rate is equally applicable to the present invention. Some of the methods for determining that the data rates should be reduced include:

(a) mobile station detection of high frame error rate on forward link;
(b) base station detection of high frame error rate on reverse link;
(c) mobile station detects its power is at a maximum for the reverse link;
(d) base station detects its power is at a maximum for the forward link;
(e) mobile station detects that received power is low on forward link;
(f) base station detects that received power is low on reverse link;
(g) base station to mobile station range is large; and
(h) mobile station location is poor.

Conversely, some of the methods for determining that the data rates should be increased include:

(a) mobile station detection of low frame error rate on forward link;
(b) base station detection of low frame error rate on reverse link;
(c) mobile station detects its power is lower than a threshold for the reverse link;
(d) base station detects its power is lower than a threshold for the forward link;
(e) mobile station detects that received power is high on forward link;
(f) base station detects that received power is high on reverse link;
(g) base station to mobile station range is low; and
(h) mobile station location is good.

Figure 4:
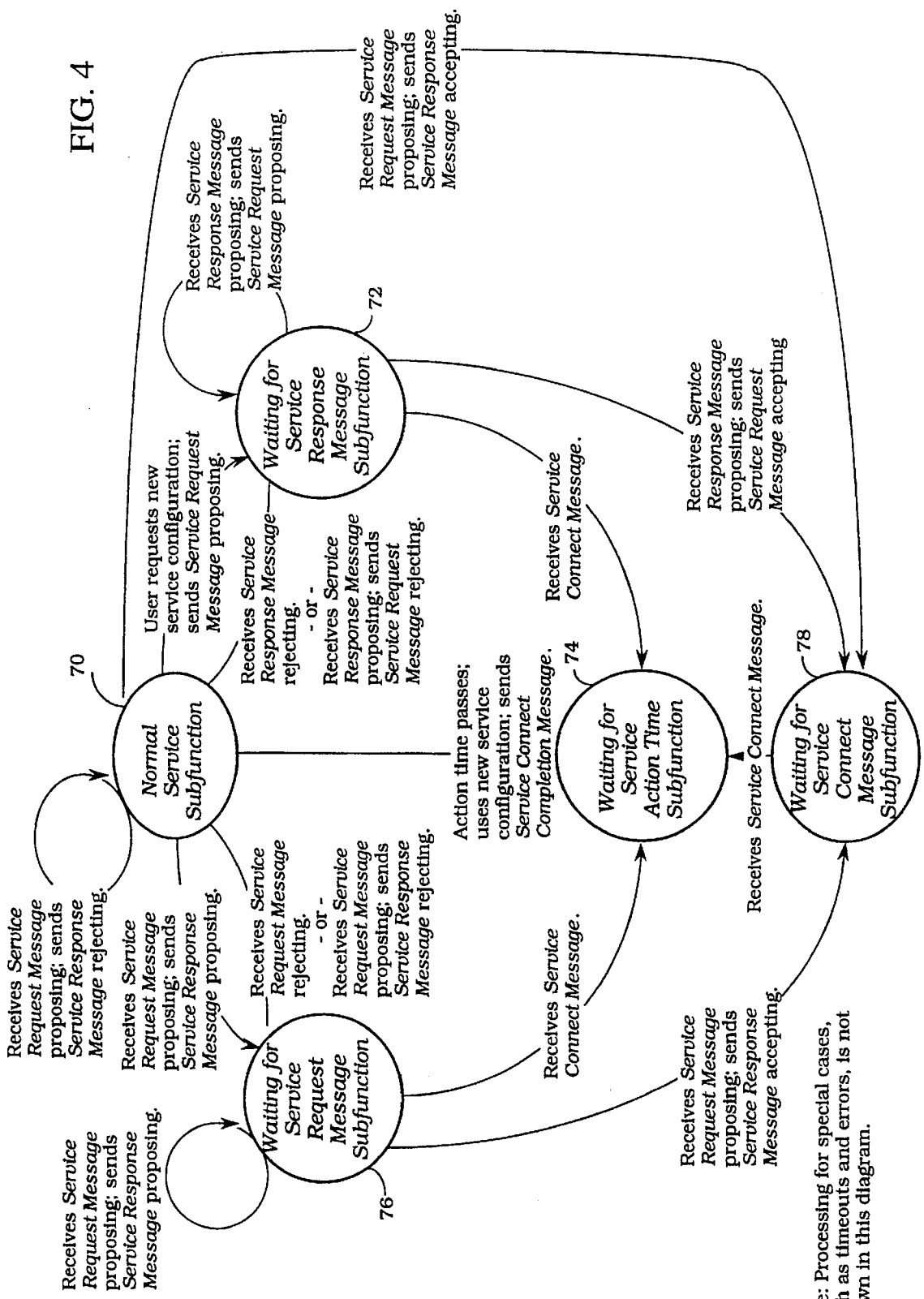
FIG. 4 is a state diagram illustrating the method of service configuration negotiation while a call is in progress for the mobile station.

FIG. 4 illustrates a state diagram for the mobile station of the present invention. The following are the definition of the states or subfunction of the mobile station of the present invention:

1. Normal Service Subfunction—While this subfunction is active, the mobile station processes service configuration requests from the user and from the base station.

2. Waiting for Service Request Message Subfunction—While this subfunction is active, the mobile station waits to receive a Service Request Message.

3. Waiting for Service Response Message Subfunction—While this subfunction is active, the mobile station waits to receive a Service Response Message.

4. Waiting for Service Connect Message Subfunction—While this subfunction is active, the mobile station waits to receive a Service Connect Message.

5. Waiting for Service Action Time Subfunction—While this subfunction is active, the mobile station waits for the action time associated with a new service configuration and then sends a Service Connect Completion Message.

At any given time during traffic channel operation, only one of the service subfunctions is active and the mobile station performs the processing associated with that subfunction. For example, when the mobile station first begins communication on the traffic channel, the normal service subfunction is active. Each of the other subfunctions can become active in response to various events which occur during traffic channel operation. In addition it is envisioned as in the case of traffic channel connection initiation that at any point in the service negotiation status request and response messages may be exchanged and service negotiation conducted in accordance with the exchanged capability information.

The mobile station transmits service request messages and service response messages that accept or reject a requested service configuration or suggest an alternative service configuration. The base station transmits request and response messages that reject or suggest an alternative service configuration. If the base station accepts a requested service configuration, it transmits a connect message, which indicates the acceptance of the requested service configuration and specifies an action time at which the agreed upon service configuration change will occur.

Referring to FIG. 4, the service negotiation procedure for the mobile station is illustrated. In the normal service subfunction block 70, the mobile station may receive a request message from the base station or may receive a request from the user for a new service configuration. If the mobile station receives a request for a new service configuration from the user, the mobile station sends a service request message indicative of the desired new service configuration to the base station and enters the waiting for service response message subfunction block 72.

When the mobile station receives a service request message, it may as previously stated accept or reject the requested service or it may suggest an alternative service. If the mobile station accepts the requested service configuration, it sends a response message accepting the requested configuration and enters the waiting for connect message subfunction block 78. If the mobile station rejects the requested service configuration, then the service negotiation is terminated and the mobile station enters the normal service sub function block 70. Lastly, if the mobile station suggests an alternative service configuration it sends a service response message proposing the alternative configuration and enters the waiting for service request subfunction block 76.

If the mobile station is in waiting for service request message subfunction block 76, it may receive a service request message proposing a service configuration or rejecting or it may receive a connect message from the base station. If the mobile station receives a request message rejecting the proposed service configuration, then service negotiation is terminated and the mobile station enters normal service sub function block 70. Also, if the mobile station receives a service request message proposing a service configuration, the mobile station may reject the proposed service configuration, terminating service negotiation and entering normal service subfunction block 70.

In addition, if the mobile station is in waiting for service request message subfunction block 76, and receives a message proposing a service configuration the mobile station may send a service response message proposing an alternative service configuration and in this case the mobile station will remain in waiting for service request message subfunction block 76. If the mobile station is in waiting for service request message subfunction block 76, and receives a service request message requesting an acceptable configuration, then the mobile station transmits a service response message accepting the proposed service configuration. If the mobile station receives a service connect message indicating that the service configuration requested by the mobile station is acceptable to the base station, then the mobile station enters the waiting for service action time subfunction 74. The connect message specifies the service action time when both mobile station and base station change over to the new agreed upon service configuration.

If the mobile station is in the waiting for service response message subfunction block 72, it may receive a service response message rejecting or proposing an alternative service configuration or it may receive a connect message. If it receives a connect message it enters the waiting for service action time subfunction block 74 and waits until the action time to change to the new agreed upon service configuration. If it receives a service response message rejecting a proposed service configuration, then it returns to normal service subfunction block 70. Also if it receives a response message proposing an unacceptable service configuration, it may reject the proposed service configuration, in which case it sends a service request message rejecting the proposed service configuration and returns to normal service subfunction block 70. If it receives a service response message proposing an alternative service configuration, the mobile station may also transmit a service request message proposing another alternative service configuration and remain in the waiting for service response message subfunction block 72. Lastly, the mobile station may receive a service response message proposing an acceptable service configuration, in which case the mobile station will send a service request message accepting the proposed service configuration and enter waiting for service connect message subfunction block 78.

If the mobile station is in waiting for service connect message subfunction block 78, then a service configuration agreement has been reached and all that remains is to receive information upon when the change in service configuration should be conducted. Upon receiving the service connect message the mobile station enters the waiting for the service action time subfunction 74. In waiting for service action time sub function block 74, the mobile station waits for the time to change to the new service configuration. At the action time the mobile station and the base station simultaneously change over to the new service configuration. After the action time the mobile station transmits a service connect completion message to the base station and re-enters the normal service subfunction block 70 where communication is conducted under the new configuration.

Figure 5:
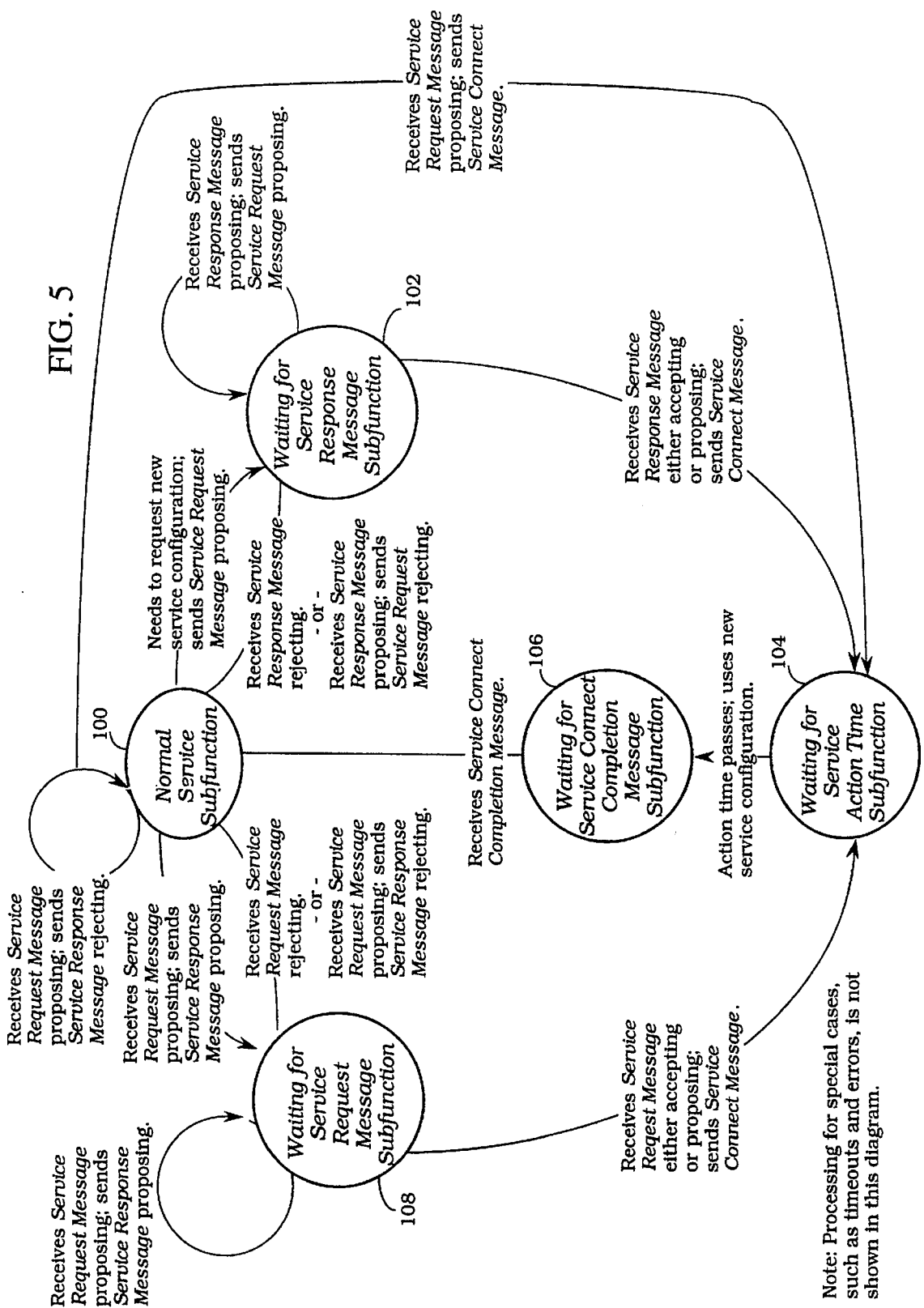
FIG. 5 is a state diagram illustrating the method of service configuration negotiation while a call is in progress for the base station.

FIG. 5 illustrates a state diagram for the base station of the present invention. The following are the definition of the states or subfunction of the base station of the present invention:

1. Normal Service Subfunction—While this subfunction is active, the base station processes service configuration requests from the personal station and sends service configuration requests to the personal station.

2. Waiting for Service Request Message Subfunction—While this subfunction is active, the base station waits to receive a Service Request Message.

3. Waiting for Service Response Message Subfunction—While this subfunction is active, the base station waits to receive a Service Response Message.

4. Waiting for Service Action Time Subfunction—While this subfunction is active, the base station waits for the action time associated with a new service configuration.

5. Waiting for Service Connect Completion Message—While this subfunction is active, the base station waits to receive a Service Connect Completion Message.

At any given time during traffic channel operation, only one of the service subfunctions is active and the base station performs the processing associated with that subfunction. For example, when the base station first enters upon communication on the traffic channel, the normal service subfunction is active. Each of the other subfunctions can become active in response to various events which occur during traffic channel operation.

In normal service subfunction block 100, the base station is communicating with the mobile station. The base station may receive a service request message or may need to request a new service configuration. If the base station needs to request a new service configuration, it transmits a service request message proposing a new configuration and enters the waiting for service response message subfunction block 102. If it receives a service request message proposing an acceptable configuration, it transmits a service connect message indicative of acceptance of the proposed service configuration and including an action time message indicative of the time at which the change to the new service configuration will be made and enters the waiting for service action time subfunction block 104. If the base station receives a service request message proposing an unacceptable service configuration, it may send a service response message rejecting the proposed service configuration and remain in the normal service subfunction 100 or the base station may send a service response message proposing an alternative service configuration and enter waiting for service request message subfunction block 108.

If the base station is in waiting for service request message subfunction block 108, it may receive a service request message indicating acceptance of a proposed service configuration or proposing an acceptable alternative service configuration, in which case the base station sends a service connect message including a service action time and enters the waiting for service action time subfunction block 104. If the base station receives a service request message proposing a service configuration, it may also send a service response message proposing an alternative service configuration. If the base station receives a service request message rejecting the proposed service configuration, then service negotiation is terminated and the base station enters normal service subfunction 100. Also if the base station receives a service request message proposing an unacceptable configuration, it may send a service response message rejecting the proposed configuration, terminating service negotiation and enter normal service subfunction block 100.

If the base station is in waiting for response message subfunction block 102, it may receive a service response message accepting or rejecting a proposed service configuration or proposing an alternative service configuration. If it receives a service response message rejecting a proposed service configuration then service negotiation is terminated and it returns to normal service subfunction block 100. If the base station receives a service response message proposing an unacceptable configuration it may send a service request message rejecting the proposed service configuration terminating service negotiation and return to normal service subfunction block 100 or it may send a service request message proposing an alternative configuration and remain in waiting for service response message subfunction block 102. If the base station receives a service response message accepting a proposed service configuration or proposing an acceptable alternative service configuration then it sends a service connect message including an action time and enters the waiting for service action time sub function block 104.

If the base station is in waiting for service action time block 104 it waits until the action time arrives and then uses the new service configuration and enters the waiting for service connect completion message subfunction 106. Upon receiving service connect completion message 106 the base station enters normal service subfunction block 100.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a wireless communication system in which a first communication device originates a communication service with a second communication device, a method for negotiating service configuration, comprising the steps of:

generating a request message indicative of a requested service configuration of said first communication device;

transmitting said request message;

receiving said request message at said second communication device;

determining if said requested service configuration is acceptable to said second communication device in accordance with current capabilities of said second communication device;

generating a response message in accordance with said determination;

transmitting said response message from said second communication device and receiving said response message at said first communication device; and determining, at said first communication device, whether to establish communication with said second communication device based on said response message, wherein said messages are transmitted over a common channel provided for general messaging services between communication devices of said wireless communication system, and wherein if said response message rejects said requested service configuration said method further comprises the step of communicating service negotiation messages over a traffic channel, said traffic channel being a communication channel allocated for communication between said first and second communication devices.

2. The method of claim 1 wherein said response message is indicative of acceptance, rejection or suggesting an alternative service configuration.

3. The method of claim 1, wherein said service configuration provides a forward link multiplex option.

4. The method of claim 1, wherein said service configuration provides a reverse link multiplex option.

5. The method of claim 1, wherein said service configuration provides forward link transmission rates.

6. The method of claim 1, wherein said service configuration provides reverse link transmission rates.

7. The method of claim 1, wherein said service configuration provides a service option.

8. The method of claim 1, wherein said response message is transmitted within a channel assignment message.

9. The method of claim 8, wherein the identity of said traffic channel is provided in said channel assignment message.

10. The method of claim 1, wherein said first communication device is a mobile station and said request message is transmitted over an access channel.

11. The method of claim 1, wherein said first communication device is a base station and said request message is transmitted over a paging channel.

12. The method of claim 1, wherein said second communication device is a mobile station and said response message is transmitted over an access channel.

13. The method of claim 1, wherein said second communication device is a base station and said response message is transmitted over a paging channel.

14. The method of claim 1, wherein said first communication device is a mobile station and said request message is transmitted over an access channel and wherein said second communication device is a base station and said response message is transmitted over a paging channel.

15. The method of claim 1, wherein said first communication device is a base station and said request message is transmitted over a paging channel and wherein said second communication device is a mobile station and said response message is transmitted over an access channel.

16. In a wireless communication system in which a first communication device originates a communication service with a second communication device, a system for negotiating service configuration, comprising service request generator means for generating a request message indicative of a service configuration of a predetermined set of first communication device service configurations at said first communication device;

transmitter means for transmitting said request message;

receiver means for receiving said transmitted message at said second communication device;

service control means for determining if said service configuration request is acceptable to said second communication device in accordance with current capabilities of said second communication device;

service response generator for generating a response message in accordance with said determination; and second transmitter means for transmitting said response message wherein said request message and said response message are transmitted over a common channel and wherein said common channel is provided for general messaging services between communication devices of said wireless communication system, and also wherein if said response message rejects said requested service configuration said system communicating service negotiation messages over a traffic channel, said traffic channel being a communications channel allocated for conducting communications between said first communications device and said second communications device.

17. The system of claim 16, wherein said service configuration provides a forward link multiplex option.

18. The system of claim 16, wherein said service configuration provides a reverse link multiplex option.

19. The system of claim 16, wherein said service configuration provides forward link transmission rates.

20. The system of claim 16, wherein said service configuration provides reverse link transmission rates.

21. The system of claim 16, wherein said service configuration provides a service option.

22. The system of claim 16, wherein said response message is transmitted within a channel assignment message.

23. The system of claim 22, wherein the identity of said traffic channel is provided in said channel assignment message.

24. The system of claim 16, wherein said first communication device is a mobile station and said request message is transmitted over an access channel.

25. The system of claim 16, wherein said first communication device is a base station and said request message is transmitted over a paging channel.

26. The system of claim 16, wherein said second communication device is a mobile station and said response message is transmitted over an access channel.

27. The system of claim 16, wherein said second communication device is a base station and said response message is transmitted over a paging channel.

28. The system of claim 16, wherein said first communication device is a mobile station and said request message is transmitted over an access channel and wherein said second communication device is a base station and said response message is transmitted over a paging channel.

29. The system of claim 16, wherein said first communication device is a base station and said request message is transmitted over a paging channel and wherein said second communication device is a mobile station and said response message is transmitted over an access channel.

* * * * *